United States Patent [19]
Maruyama

[11] Patent Number: 6,000,321
[45] Date of Patent: Dec. 14, 1999

[54] RICE WASHING APPARATUS

[75] Inventor: Norio Maruyama, Hirakata, Japan

[73] Assignee: Kabushiki Kaisha International Chemical, Kumamoto-ken, Japan

[21] Appl. No.: 09/338,647

[22] Filed: Jun. 23, 1999

[51] Int. Cl.⁶ .......................... A47J 43/24; A01N 37/18; B02B 1/04
[52] U.S. Cl. ................................ 99/536; 99/495; 99/516; 134/113; 134/117; 134/155; 134/162; 134/198
[58] Field of Search ..................... 99/516, 519, 534–536, 99/600, 609, 495, 511; 134/65, 132, 149, 153, 155, 157, 162, 198, 113, 117, 201; 210/380.1, 244, 464; 366/234, 318, 226; 426/507, 519; D7/667

[56] References Cited

U.S. PATENT DOCUMENTS

| | | | |
|---|---|---|---|
| 3,791,630 | 2/1974 | Hinds, Jr. | 99/455 X |
| 3,938,534 | 2/1976 | Akizawa | 134/133 X |
| 4,184,775 | 1/1980 | Akizawa | 99/536 X |
| 4,548,221 | 10/1985 | Abrams | 99/536 X |
| 4,756,323 | 7/1988 | Horton | 134/113 |
| 5,044,387 | 9/1991 | Hsu | 210/244 X |
| 5,119,721 | 6/1992 | Satake et al. | 99/536 X |
| 5,184,544 | 2/1993 | Ling | 99/536 |
| 5,512,310 | 4/1996 | Graef | 99/536 X |
| 5,586,492 | 12/1996 | Graef | 99/516 X |
| 5,778,769 | 7/1997 | Dodson | 99/536 |

FOREIGN PATENT DOCUMENTS 8-299203  11/1996  Japan.

Primary Examiner—Timothy Simone
Attorney, Agent, or Firm—Rodman & Rodman

[57] ABSTRACT

A rice washing apparatus comprising a rice washing apparatus body including a rice washing vessel portion and a carryout portion formed on an upper outer periphery of the rice washing vessel portion and a lid adapted to cover an upper opening portion of the carryout portion, the rice washing vessel portion including a nozzle port formed in a central area of a bottom portion thereof, a stream guide tube vertically supported at a central area within the rice washing vessel portion immediately above the nozzle port and between the nozzle portion and the lid with a space, and a drainage hole opening at an area in the vicinity of the nozzle port, the carryout portion including an outlet port, and switch means disposed between the lid and the rice washing apparatus body and adapted to selectively switch between a rice washing position for tightly closing the rice washing vessel portion and a carrying out position where the rice washing vessel portion is in communication with the carryout portion.

6 Claims, 5 Drawing Sheets

PRIOR ART

RICE WASHING APPARATUS

BACKGROUND OF THE INVENTION

This invention relates to a rice washing apparatus which is used for washing rice prior to boiling.

As a related art of such a rice washing apparatus, there is known an apparatus as disclosed in Japanese Patent Unexamined Publication (Kokai) No. Hei 8-299203. As shown in FIG. 5, the disclosed apparatus comprises a cylindrical container 101 with a bottom, and a lid 103 for covering an upper opening portion 102 of the container 101. It has a conical projection 104 formed on and projecting from a central area of the bottom portion and a drainage port 105 opening in its upper side surface. The lid 103 includes a water jetting tube 106 vertically disposed at the center and a water discharge filter 107 fixed to a lower portion of the water jetting tube 106 and having the same inside diameter as the container 101. For using this apparatus, rice is put into the container 101 and then the lid 103 is closed relative to the container 101. Then, a service water is supplied into the container 101 from the water jetting tube 106 which is connected to a water supply hose 108. By doing so, the service water is jetted towards the projection 104 and hit it so as to be dispersed in all lateral directions, thereby providing a circulating stream within the container 10. The rice within the container 101 is circulated together with the circulating stream and stirred so that the rice grains are washed by rubbing each other. A dirty water after use for washing the rice is discharged from the drainage port 105 via the water discharge filter 107. The washed rice is removed from the container 101 by opening the lid 103 and put into another container.

However, the above conventional rice washing apparatus has the following shortcomings. Since the space between the jetting port formed in the lower end of the water jetting port and the conical projection formed in the container is too large, thus allowing presence of rice to be washed in this large space. Because of the presence of rice in the space, there is a possibility that the jetted water from the water jetting tube does not reach the projection. Since an occurrence of a circulating stream large enough for stirring the rice while circulating cannot be expected, the washing ability of this apparatus is problematical. Furthermore, since the rice is shifted into another container after the rice is washed, the rice gains adhered to the inner wall surface of the container remain as they are. Therefore, those rice gains must be removed by hand and thus not sanitary. Besides, this is against the object of the invention aiming at washing rice without touching water and rice.

SUMMARY OF THE INVENTION

It is, therefore, an object of the present invention to provide a rice washing apparatus which is capable of automatically washing rice without touching water and rice and removing the rice in a sanitary manner.

To achieve the above object, there is essentially provided a rice washing apparatus comprising a rice washing apparatus body including a rice washing vessel portion and a carryout portion formed on an upper outer periphery of said rice washing vessel portion and a lid adapted to cover an upper opening portion of the carryout portion.

The rice washing vessel portion includes a nozzle port for jetting a water, a stream guide tube for generating a circulating stream within the rice washing vessel portion, and a drainage hole for discharging a dirty water after used for washing rice.

The lid includes a dam piece for flowing down rice grains adhered to an inner wall surface of the rice washing vessel portion in one process for flowing the washed rice into the carryout portion from the rice washing vessel portion.

Between the lid and the rice washing vessel portion, there is disposed switch means for selectively switching between a rice washing position and a rice carrying out position.

BRIEF DESCRIPTION OF THE DRAWING

The several sheets of the accompanying drawing show a rice washing apparatus according to one embodiment of the present invention, wherein.

BEST MODE FOR CARRYING OUT THE INVENTION

Figure 1:
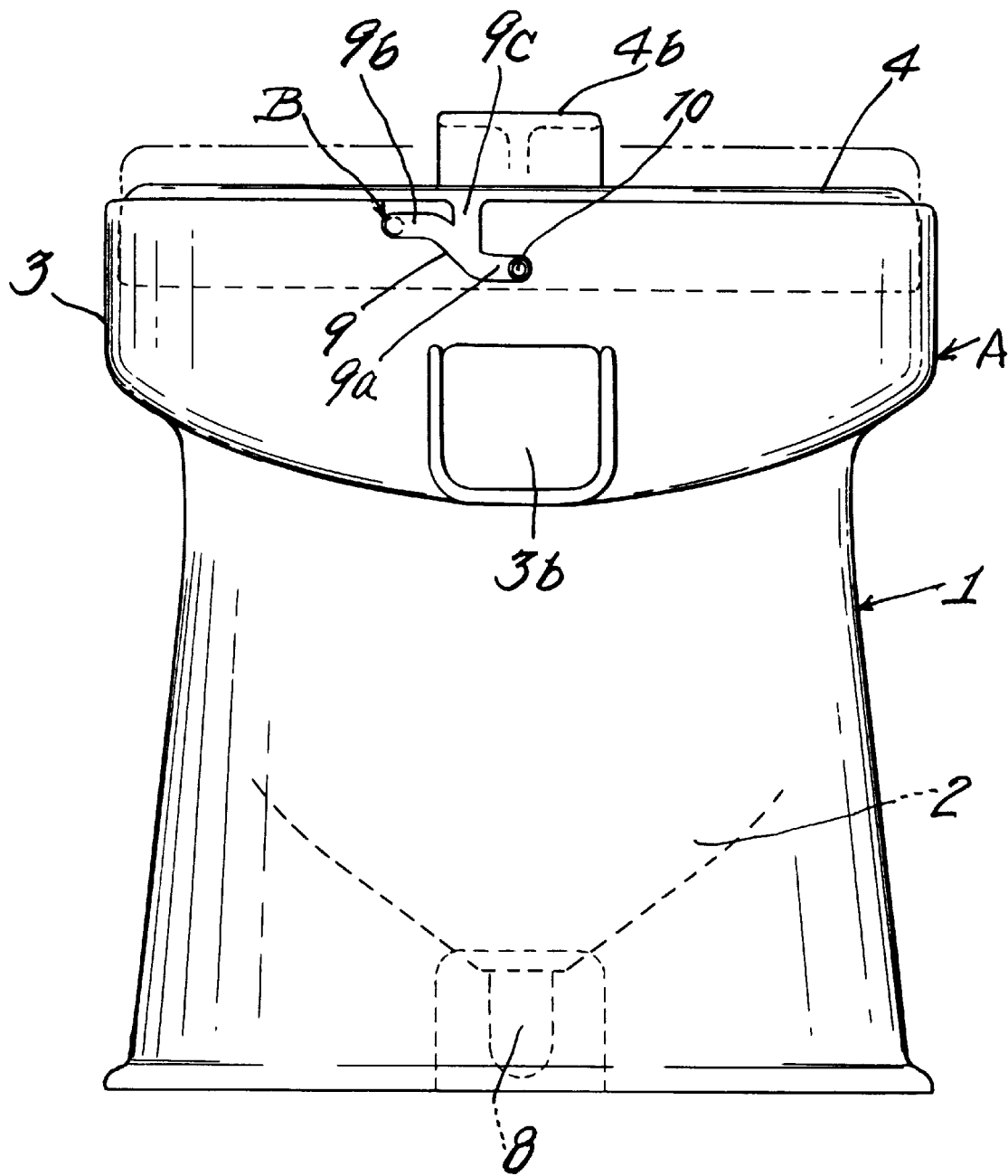
FIG. 1 is a front view of the rice washing apparatus.

Reference symbol A denotes a rice washing apparatus. This rice washing apparatus A comprises a rice washing apparatus body including a rice washing vessel portion 2 for washing rice therein and a carryout portion 3 formed on an upper outer periphery of the rice washing vessel portion 2 and adapted to carry out rice which has been washed, a lid 4 for covering an upper opening portion 2a of the rice washing vessel portion 2 and an upper opening portion 3a of the carryout portion 3, and switch means B for selectively switching between a rice washing position and a rice carrying out position.

The rice washing vessel portion 2 is formed in a ballet head configuration which becomes gradually narrower downward. A nozzle port 5 is formed in a central area of a bottom portion of the rice washing vessel portion 2. This nozzle port 5 is adapted to jet water into the rice washing vessel portion 2. The nozzle port 5 is narrow at its inner side towards the interior of the rice washing vessel portion 2. An inlet side of the nozzle port 5 is in the form of a projection for facilitating connection of a water feed tube 8 for feeding a pressurized water such as a service water. A stream guide tube 6 is disposed within the rice washing vessel portion 2. This stream guide tube 6 is adapted to generate a circulating stream within the rice washing vessel portion 2 when a water is jetted into the rice washing vessel portion 2. The stream guide tube 5 is gradually reduced in diameter upwardly from its lower end and enlarged in diameter again at its upper portion. The stream guide tube 5 is vertically supported on the center of the rice washing vessel portion 2 by horizontal pieces 6a spacedly between the nozzle port 5 and the lid 4. By this, the stream guide tube 6 is disposed immediately above the nozzle port 5. A plurality of discharge holes 7 are formed in a periphery of the nozzle port 5. Those discharge holes 7 are adapted to discharge dirty water after use for washing rice. An opening of each discharge hole 7 is dimensioned such that a rice grain is not allowed to pass therethrough.

The carryout portion 3 is in the form of a groove which is slanted in one direction and formed around an outer periphery of the rice washing vessel portion 2. An outlet port 3b for discharging washed rice is formed in a side wall portion at the lowermost portion of the carryout portion 3.

Figure 2:
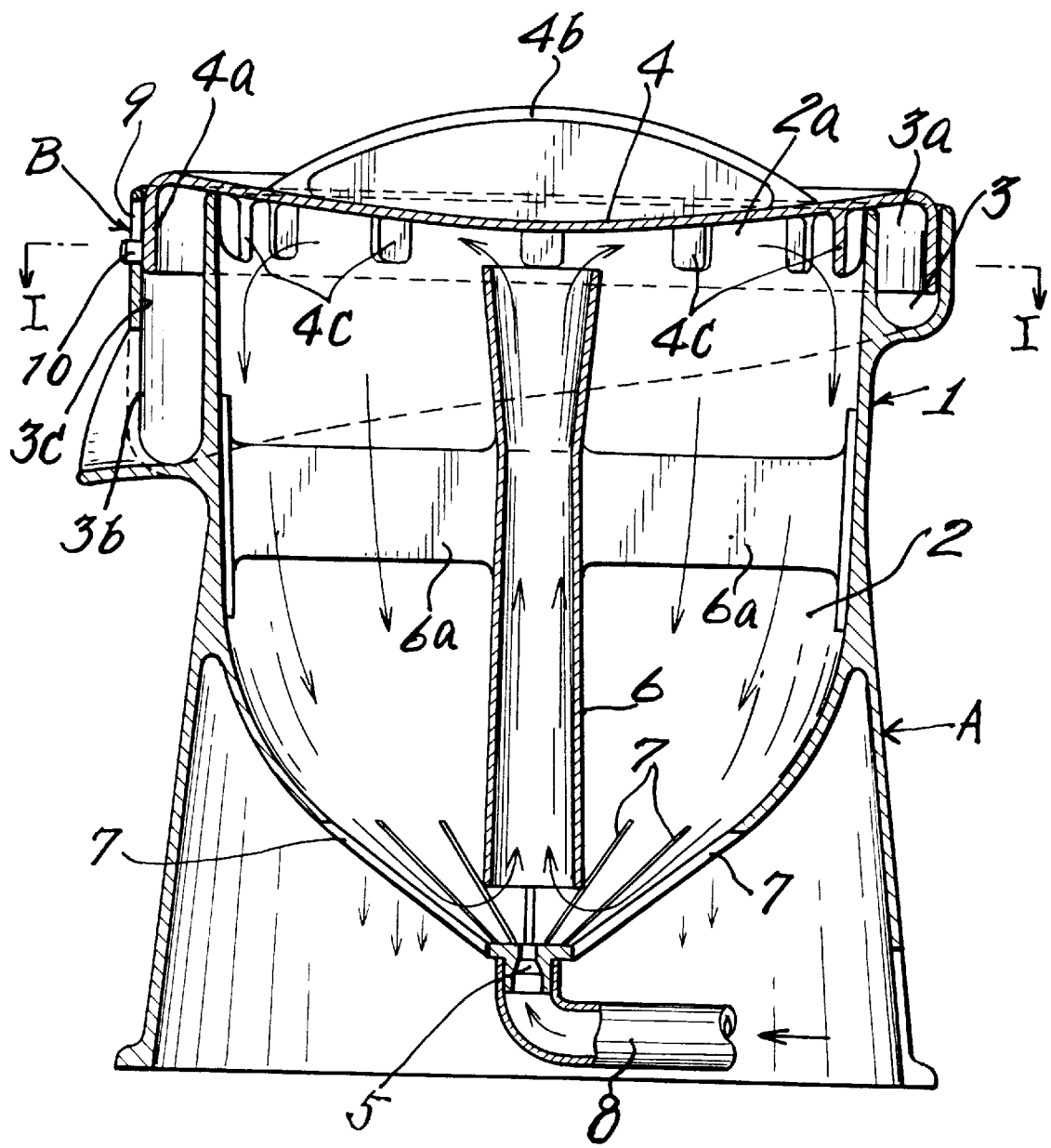
FIG. 2 is a vertical sectional side view showing a state in which rice washing operation is undergoing.

The lid 4 covers the upper opening portion 2a of the rice washing vessel portion 2 and the upper opening portion 3a of the carryout portion 3 with a vertical peripheral wall portion 4a in contact with an inner peripheral surface of an outer peripheral wall portion 3c of the carryout portion 3 in the rice washing apparatus body 1. The lid 4 has a handle 4b formed on an upper surface thereof. The lid 4 also has a plurality of projecting dam pieces 4c are spacedly formed in a concentric position slightly internal side from a peripheral edge of the opening portion 2a within the rice washing vessel portion 2 (see FIG. 2).

The switch means B for switching between the rice washing position and the carrying out position is a means for switching between a first position where rice in the rice washing vessel portion 2 is washed and a second position where the washed rice is flowed into the carryout portion 3 from the rice washing vessel portion 2 and removed from the outlet port 3b, by properly controlling the cover 4 covering the rice washing vessel portion 2 and carryout portion 3. The switch means B is equally spacedly arranged at three places between the peripheral wall portion 4a of the lid 4 and the outer peripheral wall portion 3c of the carryout portion 3 in the rice washing apparatus body 1.

Figure 3:
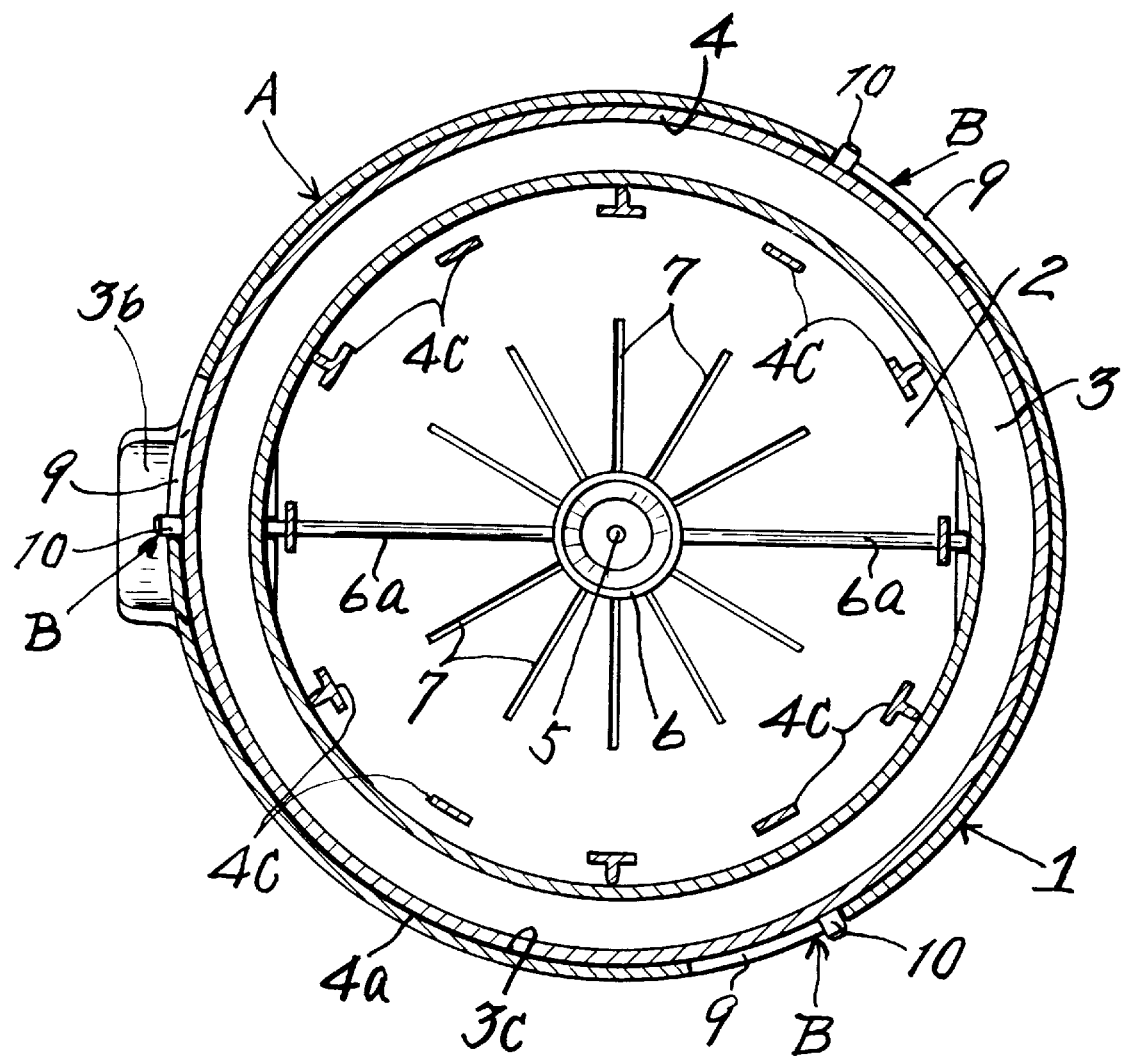
FIG. 3 is a sectional view taken on line I—I of FIG. 2.
Figure 4:
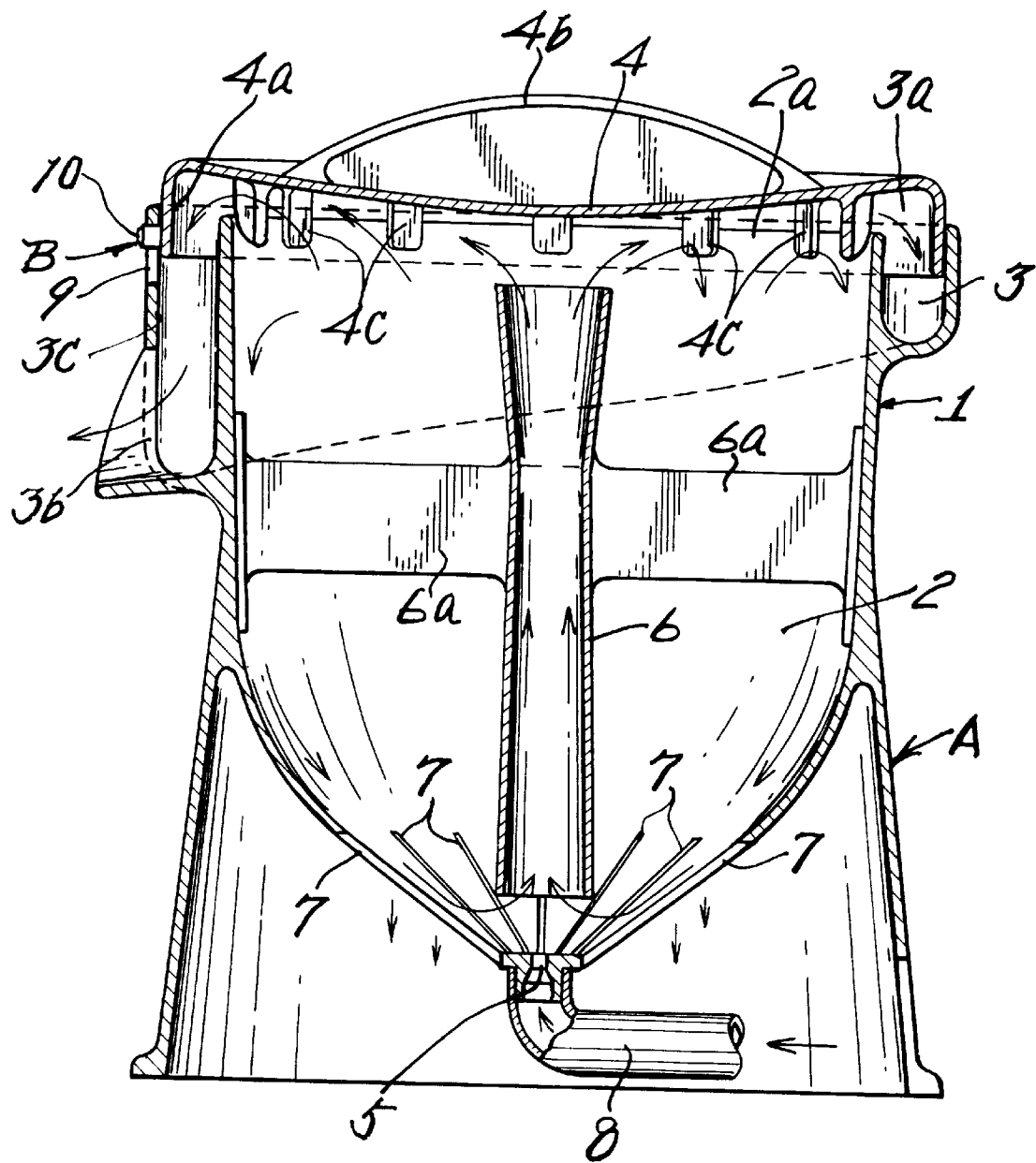
FIG. 4 is a vertical sectional side view showing a state in which removing operation of washed rice is undergoing.
Figure 5:
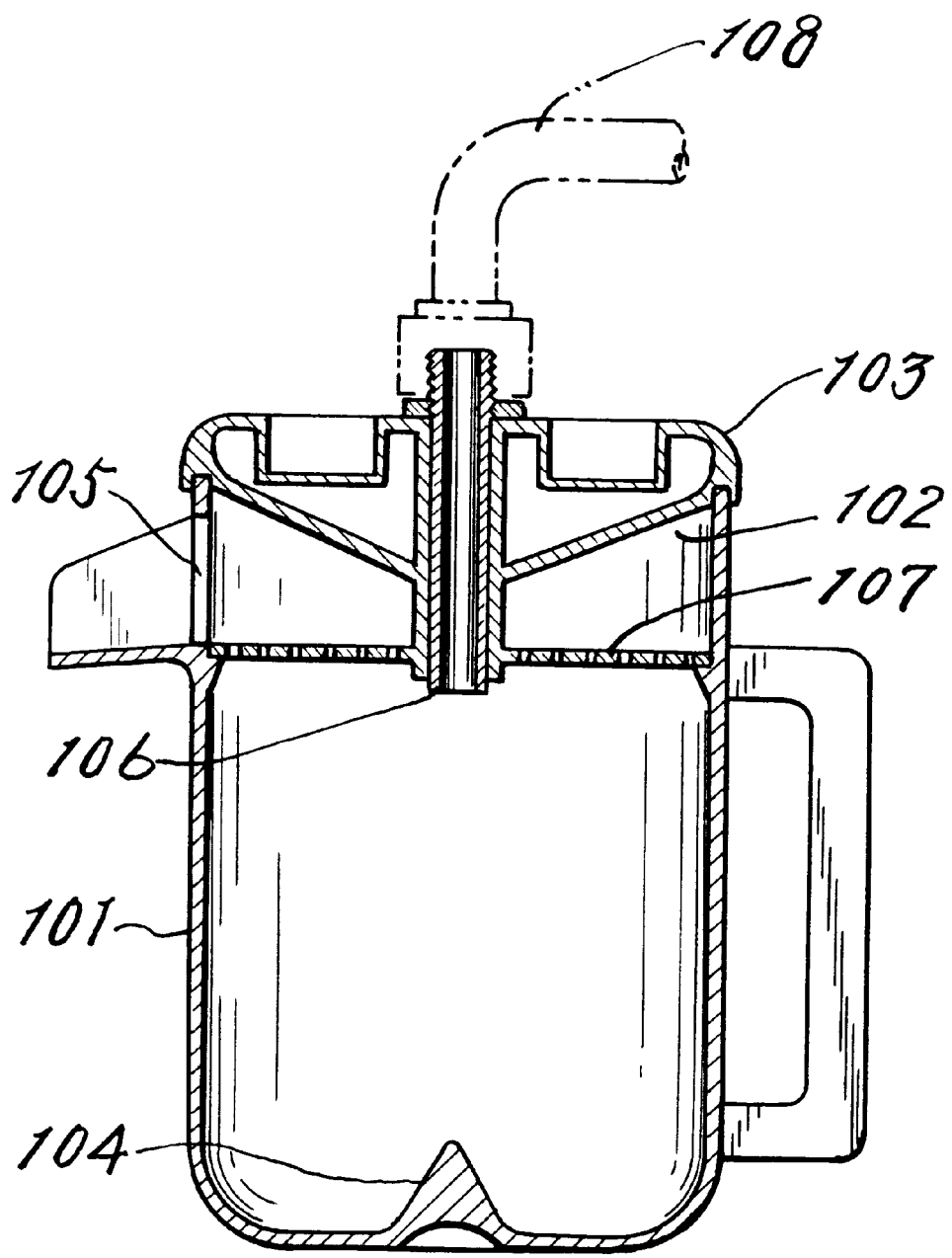
FIG. 5 is a vertical sectional side view of the conventional rice washing apparatus.

The respective switch means B comprise a stepped cam cavity 9 formed in an outer wall 3c of the carryout portion 3 and a pin 10 formed on the peripheral wall portion 4a of the lid 4. The stepped cam cavity 9 includes a lower stage horizontal portion 9a where a pin 10 is brought into engagement with the stepped cam cavity 9 in a rice washing position where the upper opening portion 2a of the rice washing vessel portion 2 is tightly closed by a lower surface of the lid 4 to provide a rice washing state (see FIG. 2), an upper stage horizontal portion 9b where the pin 10 is brought into engagement with the stepped cam cavity 9 in a carrying out position where the lower surface of the lid 4 is brought away from the upper opening portion 2a of the rice washing vessel portion 2 to allow the rice washing vessel portion 2 to communicate with the carryout portion 3, thereby providing a state for flowing the washed rice into the carryout portion 3 (see FIG. 3), and a vertical portion 9c for allowing the pin 10 to pass therethrough in order to remove the lid 4.

For washing rice in this rice washing apparatus A, a required quantity of rice is put into the rice washing vessel portion 2 of the rice washing apparatus body 1. Then, the lid 10 is closed while fitting the pin 10 of the lid 4 into the vertical portion 9c of the stepped cam cavity 9 in the respective switch means B. Then, the handle 4b is turned to bring the pin 10 into engagement with the lower stage horizontal portion 9a of the stepped cam cavity 9. This causes the upper opening portion 2a of the rice washing vessel portion 2 by the lower surface of the lid 4. In that rice washing position, a pressurized water such as a service water is supplied to the nozzle port 5 from the water feed tube 8.

At that time, the pressurized water is jetted into the stream guide tube 6 in the rice washing vessel portion 2 from the nozzle port 5 and rice is also jetted into the stream guide tube 6 together with the jetted stream. Then, the rice is discharged at an accelerated speed from the upper end by the upper enlarged diameter portion and hit the lower surface of the lid 4 so as to be flowed downward within the rice washing vessel portion 2 while dispersing in a circumferential direction. Then, the rice is jetted again into the stream guide tube 6 by the jetted water. By way of such repeated circulation of the rice caused by the circulating steam, the rice is stirred and washed by rubbing each other. The dirty water after use for washing rice is discharged from the outlet port 7 formed in an area in the vicinity of the bottom portion of the rice washing vessel portion 2.

In order to remove the washed rice from the interior of the rice washing vessel portion 2, the circulating stream is utilized as in the above-mentioned manner. The handle 4b of the lid 4 is turned in the opposite direction, the pin 10 is brought into engagement with the upper stage horizontal portion 9b of the stepped cam cavity 9 and the lower surface of the lid 4 is brought away from the upper opening portion 2a of the rice washing vessel portion 2, thus providing the carrying out position state where the rice washing vessel portion 2 is in communication with the carryout portion 3. Thus, the rice and jetted water discharged through the stream guide tube 6 are flowed into the carryout portion 3 and discharged from the outlet port 3b formed in the lowermost position of the carryout portion 3. The rice thus discharge is received with a bamboo basket or the like. The remaining rice grains adhered to the inner wall of the rice washing vessel portion 2 at that time are flowed down to the bottom portion together with the stream which flows down along the inner wall of the rice washing vessel portion 2 because the circulating stream is partly dammed by the dam pieces 4c projecting from the lower surface of the lid 4. Then, the rice grains are jetted again into the stream guide tube 6 together with the jetted water and flowed into the carryout portion 3. By repeating this procedure, the rice grains can be completely discharged.

While one preferred embodiment of a rice washing apparatus according to the present invention has thus far been described with reference to the drawing, it should be borne in mind that such an embodiment is merely illustrative of the gist of the present invention and is accordingly subject to modification and change.

What is claimed is:

1. A rice washing apparatus comprising:

a rice washing apparatus body including a rice washing vessel portion and a carryout portion formed on an upper outer periphery of said rice washing vessel portion and a lid adapted to cover an upper opening portion of said carryout portion;

said rice washing vessel portion including a nozzle port formed in a central area of a bottom portion thereof, a stream guide tube vertically supported at a central area within said rice washing vessel portion immediately above said nozzle port and between said nozzle portion and said lid with a space, and a drainage hole opening at an area in the vicinity of said nozzle port;

said carryout portion including an outlet port; and switch means disposed between said lid and said rice washing apparatus body and adapted to selectively switch between a rice washing position for tightly closing said rice washing vessel portion and a carrying out position where said rice washing vessel portion is in communication with said carryout portion.

2. A rice washing apparatus according to claim 1, wherein said rice washing vessel portion is in the form of a ballet head which becomes gradually narrower downwardly.

3. A rice washing apparatus according to claim 1, wherein said stream guide tube is gradually enlarged at an upper portion thereof in diameter towards an upper end thereof.

4. A rice washing apparatus according to claim 1, wherein said carryout portion is slanted in one direction and provided with an outlet port which is open at a lowermost position thereof.

5. A rice washing apparatus according to claim 1, wherein said lid is provided at a lower surface thereof slightly internal from a peripheral edge of an opening portion of said rice washing vessel portion with a plurality of projecting dam pieces.

6. A rice washing apparatus according to claim 1, wherein said switch means comprises a pin relatively disposed between said lid and said rice washing apparatus body, and a cam cavity engageable with said pin and having a rice washing position and a carrying out position.

* * * * *